(12) United States Patent
Bansal et al.

(10) Patent No.: US 8,843,619 B2
(45) Date of Patent: Sep. 23, 2014

(54) SYSTEM AND METHOD FOR MONITORING VISITS TO A TARGET SITE

(75) Inventors: Nilesh Bansal, Toronto (CA); Nick Koudas, Toronto (CA)

(73) Assignee: Sysomos Inc., Toronto, Ontario (CA)

( * ) Notice: Subject to any disclaimer, the term of this patent is extended or adjusted under 35 U.S.C. 154(b) by 284 days.

(21) Appl. No.: 12/964,124

(22) Filed: Dec. 9, 2010

(65) Prior Publication Data

US 2011/0145398 A1 Jun. 16, 2011

Related U.S. Application Data

(60) Provisional application No. 61/285,428, filed on Dec. 10, 2009.

(51) Int. Cl.
*G06F 15/173* (2006.01)
*G06Q 30/06* (2012.01)
*G06Q 30/02* (2012.01)

(52) U.S. Cl.
CPC ............... *G06Q 30/02* (2013.01); *G06Q 30/06* (2013.01)
USPC ........................................ 709/224

(58) Field of Classification Search
CPC ...... H04L 67/22; G06F 11/34; G06F 11/3438
USPC .......................................... 709/223–224, 203
See application file for complete search history.

(56) References Cited

U.S. PATENT DOCUMENTS

| | | | | |
|---|---|---|---|---|
| 7,464,326 | B2 * | 12/2008 | Kawai et al. | 715/205 |
| 7,941,525 | B1 * | 5/2011 | Yavilevich | 709/224 |
| 2004/0103426 | A1 * | 5/2004 | Ludvig et al. | 725/9 |
| 2007/0226062 | A1 * | 9/2007 | Hughes et al. | 705/14 |
| 2008/0120699 | A1 * | 5/2008 | Spear | 726/4 |
| 2009/0024737 | A1 * | 1/2009 | Goldspink et al. | 709/224 |
| 2009/0100015 | A1 * | 4/2009 | Golan | 707/3 |
| 2011/0071900 | A1 * | 3/2011 | Kamath et al. | 705/14.46 |
| 2012/0016959 | A1 * | 1/2012 | O'Laughlen et al. | 709/217 |

* cited by examiner

*Primary Examiner* — Jason Recek
(74) *Attorney, Agent, or Firm* — Leydig, Voit & Mayer, Ltd.

(57) ABSTRACT

Methods and systems for monitoring visits to a target site are provided. A list of one or more origin sites is embedded in the target site. A determination is made whether any entry in the list of origin sites has been previously visited.

20 Claims, 6 Drawing Sheets

SYSTEM AND METHOD FOR MONITORING VISITS TO A TARGET SITE

CROSS-REFERENCE TO RELATED APPLICATION

This application claims priority from U.S. provisional application No. 61/285,428, filed Dec. 10, 2009, the entirety of which is hereby incorporated by reference.

TECHNICAL FIELD

This application relates to analyzing the effects of social media. In particular, this application relates to a system and method for monitoring visits to a target site.

BACKGROUND

The use of social media, including services such as social networks, microblogging platforms like Twitter, blogs, news media, audio and video sharing sites, and wikis, is increasing occurring at a fast pace. The ability to interact and share content with others online in real time may give rise to different forms of interactions. Moreover social media may be used to enrich the way users can interact with brands, companies and services online. It may be useful to implement and exploit tools for online social media analysis.

SUMMARY

In some example aspects, the present disclosure provides a system for monitoring visits to a target site on a network, the system comprising a server including: a processor; a communication subsystem for transmitting and receiving signals with the network; and a memory coupled to the processor, the memory having stored thereon processor-executable instructions that, when executed, cause the processor to: in response to received signals indicating a request to access the target site, retrieve a list of one or more origin sites from the memory; transmit the list of one or more origin sites to be embedded in the target site; and receive signals representing a data set including a list of any entries in the list of one or more origin sites that have been visited.

In some example aspects, the present disclosure provides a method, at a server, for monitoring visits to a target site, the method comprising: in response to received signals indicating a request to access the target site, retrieving a list of one or more origin sites; transmitting the list of one or more origin sites to be embedded in the target site; and receiving signals representing a data set including a list of any entries in the list of one or more origin sites that have been visited.

In some example aspects, the present disclosure provides a method for monitoring visits to a target site, the method comprising: in response to a received request to access the target site, transmitting a data set representing the target site to be rendered, the data set including instructions for embedding a list of one or more origin sites within the target site; determining whether any entry in the list of one or more origin sites is a visited origin site, to generate a list of any visited origin sites; and transmitting a data set representing the list of any visited origin sites.

In some examples, the list of one or more origin sites may be updated (e.g., in real-time) based on a calculated metric for attributes related to the one or more origin sites.

BRIEF DESCRIPTION OF THE DRAWINGS

It will be noted that throughout the appended drawings, like features are identified by like reference numerals.

DETAILED DESCRIPTION

Figure 1:
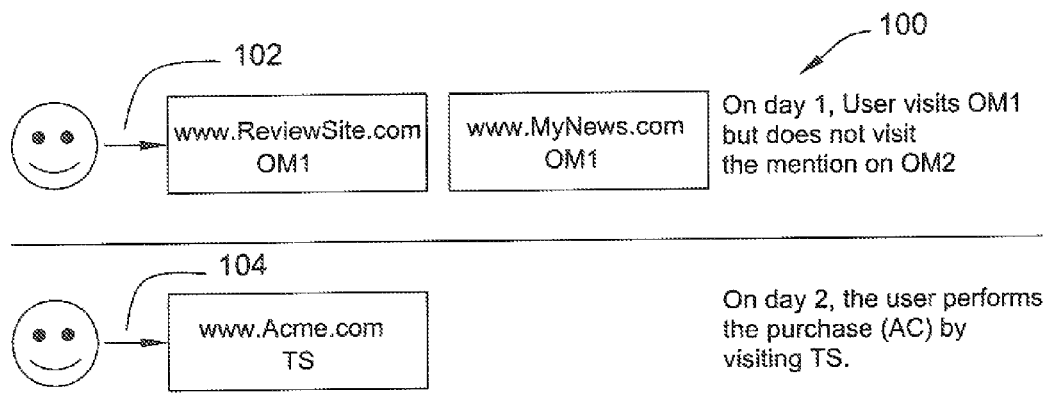
FIG. 1 shows in flow chart form an example method of monitoring visits to a target site.

Examples of social media monitoring and analytical services typically aim to quantify the extent of social media coverage for an entity of interest, such as a product, brand or company. For example, social media monitoring and analytical services, as may be described in aspects of the present disclosure, may quantify the number of mentions across one or more social platforms (e.g., blogs, news, forums, Twitter, wikis, etc.) and report on trends as a function of time, demographics and/or geography of those engaging, and extract insights based on the content posted online. Moreover it may be possible to quantify the sentiment of mentions as positive or negative.

Such example monitoring and analytical services may offer insights and/or metrics relating to the coverage of the entity being monitored (e.g., a brand). These insights and metrics may be employed as a measure of impact of a marketing campaign, product launch or a similar event, for example. While it may be argued that the number of mentions online, and positive mentions in particular, is typically correlated to the sales of a product, any such correlation may lack a quantifiable verification. Conventionally, the coverage of a product or brand (e.g., online coverage, for example across one or more social platforms) may not be formally or quantifiably linked to changes in its sales; this may be due to a lack of monitoring or attribution between, for example, a person reading a mention or review of a product and the potential resulting decision to purchase that product. In some example aspects, the present disclosure may provide methods and systems to address this need, to quantify the impact of a mention (e.g., an online or social mention, such as online coverage) of a product or brand. For example, the present disclosure may help to attribute visits to a target site (e.g., representing a product or brand) based on one or more origin media (e.g., one or more online origin sites).

One aspect of the present application provides a formal way of measuring the impact of a mention of an entity, including mentions of products, brands and company names. The mention may occur in either an online or offline fashion. Online mentions may include reviews and mentions in news sites, blogs, microblogging services, videos, audio, and/or wikis. Offline mentions may include word of mouth and in-person conversations. The resulting impact may include actions such as the purchase of the item either via the online website, via phone or physically in store, or any other event of interest performed by the user.

The present application refers to a mention (e.g., on a social media outlet, advertisement or word-of-mouth) or any other source influencing a user's visit to a target site as an online origin site or an offline origin medium. The website or online presences of a physical store engaging in the online commerce may be referred to as the target site (TS). In some examples, the target site may be presented to a user as an HTML website that the user may access over a network. The action (AC) may be either the person visiting the target site or purchasing an item or a similar event.

Consider the following example scenario. The company Acme is interested in measuring the online sales of its product (AC) to the mentions of Acme on the website of the review site ReviewSite.com and in the news site MyNews.com. In this scenario, both ReviewSite.com and MyNews.com may be the origin sites, and the target site is acme.com which is the product sales outlet for Acme products. The origin site may be, for example, websites accessible by the user, including, for example, social sites (e.g., Facebook), message boards, social feeds (e.g., Twitter), online sites of physical stores, sites with online-only presence, and/or any other suitable sites that may mention the target site. In some examples, there may be no direct link (e.g., a hyperlink) from the origin site to the target site, and hence it may be possible for the user to visit the target site without being directly redirected from the origin site. A method of attributing visits (and, in some examples, actions such as purchases) to the target site based on the origin site may be useful.

Figure 4:
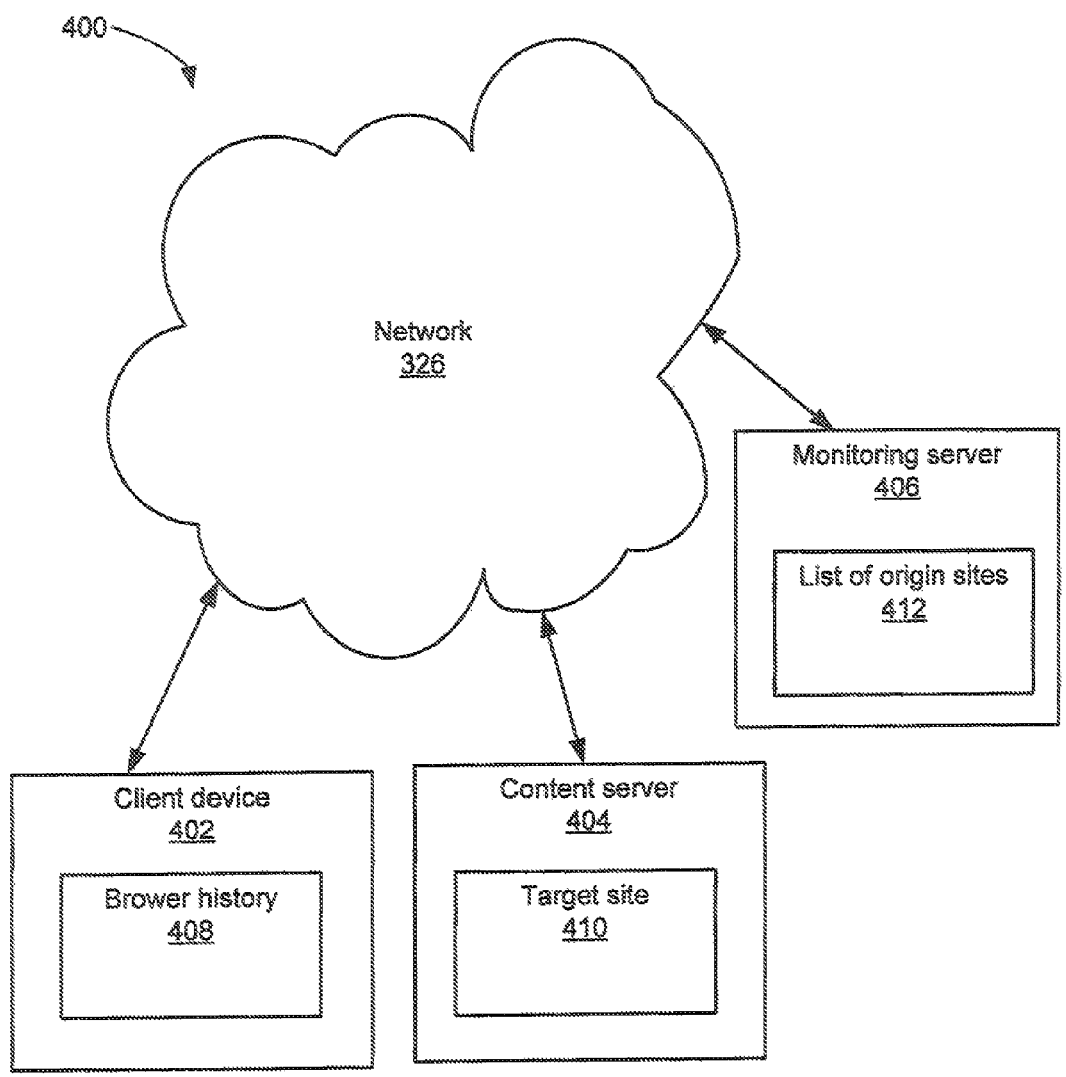
FIG. 4 shows an example system suitable for the methods of the present disclosure.

Reference is now made to FIG. 4 showing an example system 400 suitable for monitoring visits to a target site.

In this example, the system 400 may include the network 326 for wireless communication between server(s) and/or device(s). The network 326 may be, for example, a public network (e.g., the Internet), a private network (e.g., an enterprise network or an intranet), a wide area network (WAN), a local area network (LAN), a wireless local area network (WLAN), or any other suitable communication network. In some examples, communication in the system 400 may be a combination of wired and wireless communication.

The system 400 may include one or more client devices 402 that communicate via the network 326. Although only one client device 402 is shown, it should be understood that the system 400 may include more than one client device 402. The client device 402 may be, for example, a desktop computer, a handheld device, a laptop device or any other suitable computing device capable of accessing a target site. Although one client device 402 is shown, the system 400 may include multiple client devices 402, which may be similar or different. The client device 402 may include a display (e.g., a screen) for displaying the target site, one or more input devices (e.g., a keyboard and/or a mouse), a processor and a memory. The memory may be, for example, a flash memory, a random access memory (RAM), a read-only memory (ROM), and/or any other suitable memory. The client device 402 may include one or more communication subsystems for wired or wireless communication (e.g., over the network 326).

In this example, the memory of the client device 402 may include a browser history 408. The browser history 408 may be a list of recently visited websites, and may be stored as a list of URL, HTML pages or other appropriate formats. The browser history 408 may be commonly used, for example, as a cache of recently viewed website in order to avoid redundant downloading of already-viewed sites, and may include files that track a user's browsing history, such as cookies.

The system 400 may include one or more content servers 404 that host a target site 410. Although only one content server 404 is shown, it should be understood that the system 400 may include more than one content server 404. The content server 404 may host one or more target sites 410. The content server 404 may have a memory storing coding for the target site 410 (e.g., HTML coding) that may instruct the rendering of the target site 410 on the client device 402. The content server 410 may communicate through the network 326. The content server 404 may be accessible by one or more moderators and/or programmers of the target site 410 to manage the target site 410. The content server 404 may also be accessible by the client device 402 to access the target site 410, but the client device 402 may not be granted permission to manage the target site 410. In some examples, the content server 404 may be able to interact with the client device 402 through, for example, user interfaces presented in the target site 410 (e.g., pop-ups, buttons, etc.).

The system 400 may include one or more monitoring servers 406 for monitoring access to the target site 410. Although only one monitoring server 406 is shown, it should be understood that the system 400 may include more than one monitoring server 406. The monitoring server 406 may have a memory storing one or more lists of one or more origin sites 412. The list(s) of origin sites 412 may be static (e.g., pre-defined), may be dynamic (e.g., updated in real-time), or be partly static and partly dynamic (e.g., include one or more static entry while updating the remaining entries in real-time). Different target sites 410 may be associated with different lists of origin sites 412. For example, there may be a list of origin sites 412 that includes only origin sites geared towards a youth audience, while another list of origin sites 412 may include only origin sites geared towards an older audience.

In some examples, the monitoring server 406 may be the same server as the content server 404. In some examples, the monitoring server 406 may be a sub-system of the content server 404. In some examples, the monitoring server 406 may be a third-party separate from the content server 404. In addition to storing the list(s) of one or more origin sites 412, the monitoring server 406 may also perform updates to the list(s) of one or more origin sites 412. Such updates may be manual (e.g., new origin sites may be manually entered by a system administrator accessing the monitoring server 406), automated (e.g., based on an automatic search of online sites), or a combination thereof. Although not shown, the monitoring server 406 may also include a database storing results obtained from monitoring visits to the target site 410.

Figure 7:
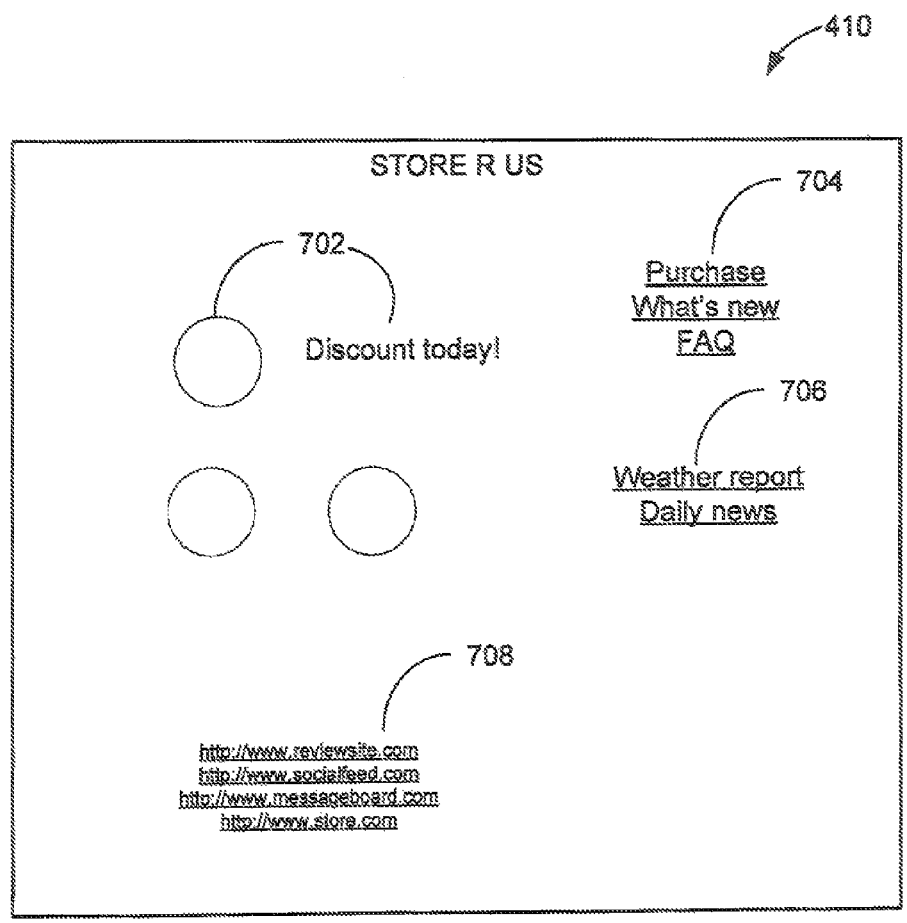
FIG. 7 is a schematic diagram illustrating an example target site suitable for the present disclosure.

FIG. 7 shows an example target site 410 that may be monitored by the methods and systems of the present disclosure. The target site 410 may be an online presence of a physical store or may be an online-only store, for example. The target site 410 may be stored as code (e.g., HTML code) in the memory of the content server 404 and may be rendered as a website on the client device 402 when accessed by the client device 402.

In this example, the target site 410 may include content 702 including, for example, images, video, text, audio, interface components (e.g., buttons, drop-down lists, etc.) and/or other suitable material. In some examples, the target site 410 may include internal links 704 that may be selectable (e.g., by clicking with a navigation device, such as a mouse) to navigate to other pages within the target site 410. In some examples, the target site 410 may also include external links 706 that may be selectable (e.g., by clicking with a navigation device, such as a mouse) to navigate to other sites that may or may not be related to the target site 410, and/or which may be hosted on other servers.

When used with the methods and systems disclosed herein, the target site 410 may also include an embedded list of origin sites 708, as will be described further below.

Referring now to FIG. 1, an example method 100 of attributing visits to a target site 410 based on one or more origin site is shown, according to one aspect of the present disclosure. In one example, a two step process for this example scenario may be applied. In a first step 102, the user may read the review of the product on an origin site (e.g., a review site). In a second step 104, the user may visit the product website for Acme (the target site 410) to make the purchase of the product (action AC). In this scenario, the user may not have been influenced by the origin site www.MyNews.com and the two steps may not take place by means of a direct hyperlink between the origin site and the target site 410.

Ways to rank each origin site based on their ability to generate visits to the target site 410 may also be provided. For example, if there is more than one origin site that mentions the target site 410, the example scenario may have multiple origin sites. The ranking of different origin sites may be, for example, produced based on impact (e.g., amount of traffic directed to the target site 410).

For example, there may be a list L of origin sites 412 that may be relevant to the target site 410. The list of origin sites 412 may be created and/or stored by the content server 404 or by the monitoring server 406 or both. The list L of origin sites 412 may be static or dynamic (i.e., may be updated by the addition or removal of one or more origin sites, periodically or intermittently). In the dynamic case, the list L of origin sites 412 may be updated in real-time to include all origin sites found to have one or more mentions of the target site 410. This update may be based on an automated search of online data, for example. When a user visits the target site 410 (either online or offline), the user's browser history 408 may be accessible or information from the browser history 408 may be obtained. The browser history 408 may include a list L' of all origin mediums the user has recently visited (e.g., within the past month) and that the user may be influenced by. It may be useful to obtain information about the list L', for monitoring visits to the target site 410 and for attributing such visits to one or more origin sites. Methods for obtaining L' are discussed below.

If an origin site belongs to both the lists L and L', that particular origin site may be attributed as being the reason of the decision of the user to visit the target site 410, to make the purchase and/or any other suitable action AC. The collection of visited origin sites L∩L' (which may be considered influencing origin sites) may be recorded (e.g., stored in a memory of the content server 404 and/or the monitoring server 406) for further processing or analysis. In the example of FIG. 1, the user has visited origin site OM1 but not origin site OM2. Thus, OM1 may be included in the list of visited origin sites but not OM2.

Using the collected lists of visited origin sites L∩L' (e.g., collected for each user over a period of time), the impact of each origin site may be quantified. For example, the impact of a single origin site may be represented by the number of times the origin site is recorded in the collection of visited origin sites for a given target site 410 over time. This definition of impact may be suitable for both online origin sites and offline origin media (e.g., print advertising) based on formal reasoning as opposed to intuitive argument.

For example, the collection of visited origin sites or media L∩L' may be carried out according to a variety of suitable techniques. The list L' in an offline scenario may be obtained by a number of means such as a questionnaire provided to the customer when entering a physical store associated with the target site 410. For print advertisement and other such offline mentions in offline origin media, different discount coupon codes that may be scanned or recorded when a printed discount is used by a customer may be employed to track L'. For a phone-based interaction, different phone numbers for different origin media may be used for tracking. In the online case (e.g., for an online target site 410 accessible through a computer), the process may be automated, such as in the example methods disclosed herein. Once L' is obtained from the user, correlation of the list L and L' may help to identify origin sites that may be relevant to the target site 410.

A general example method for monitoring visits to the online target site 410 is now described. Consider the example of an individual visiting a target site such as an online store to possibly conduct a purchase. The content server 404 of the target site 410 may load the appropriate list of origin sites 412, for example as URLs (universal resource locaters), either statically or dynamically. The list of origin sites 412 may be provided by the monitoring server 406. Each item of the list of origin sites 412 may be an online origin site of interest and this list may be loaded from a third-party server (e.g., the monitoring server 406), for example in real-time using client-side scripting logic included in the target site 410. In other examples, the list of origin sites 412 may be static, for example coded directly into the coding for the target site 410.

The list of origin sites 412 may be embedded in the target site 410 (e.g., as HTML or any other suitable format) to be rendered as an embedded list of origin sites 708 by the client device 402 accessing the target site 410. This process may be conducted using a suitable client-side scripting language such as JavaScript or any other suitable language. The target site 410 that is loaded in the web browser application of the client device 402 may contain suitable logic (e.g., encoded in the scripting language) capable of correlating the history of web site visits of the individual (e.g., as recorded in the browser history 408 of the client device 402) and the list of origin sites 412. The logic behind such correlation may utilize the capability of browsers to maintain a list of visited URLs (e.g., stored in the browser history 408) and to highlight a visited link (e.g., a link that is present in the browser history 408) in a color different than an unvisited link.

For example, the browser application may associate the hover and visited CSS property with each of the links in the list of origin sites 412 that is found in the browser history 408. The logic (e.g., JavaScript) embedded in the target site 410 may evaluate the visited property and/or colour of each item in the embedded list of origin sites 708, 412 after it is rendered on the client device 402, in order to identify which origin site has been visited and which not. In one example, the list L' may be the list of visited sites in the browser history 408 and the scripting logic described above may determine the list of visited origin sites L∩L'. In some examples, the determination of any visited origin sites may be performed by the content server 404. This determination may be performed without accessing or querying the browser history 408 of the client device 402.

An example of the script described above that may be included in the target site 410 may be as follows:

```
<script type="text/javascript">
(function() {
    var h = (("https:" == document.location.protocol) ?
        "https://audience.svsomos.com/track/t?site=svsomosLive" :
        "https://audience.svsomos.com/track/t?site=svsomosLive");
    var s = document.createElement('script'); s.type='text/javascript';
    s.async = true; s.src = h;
```

```
    var sc = document.getElementsByTagName('script')[0];
    sc.parentNode.insertBefore(s,sc);
})( );
</script>
```

The list of visited origin sites computed may be transmitted to and/or stored in a third party server (e.g., the monitoring server 406) for further processing. An example of this methodology is presented in FIG. 2, discussed below. This methodology may not need cookies, access to origin sites, or any specific end-user configuration. The proposed method may be readily deployed without changing the operations of the client device 402 and/or the content server 404.

Figure 2:
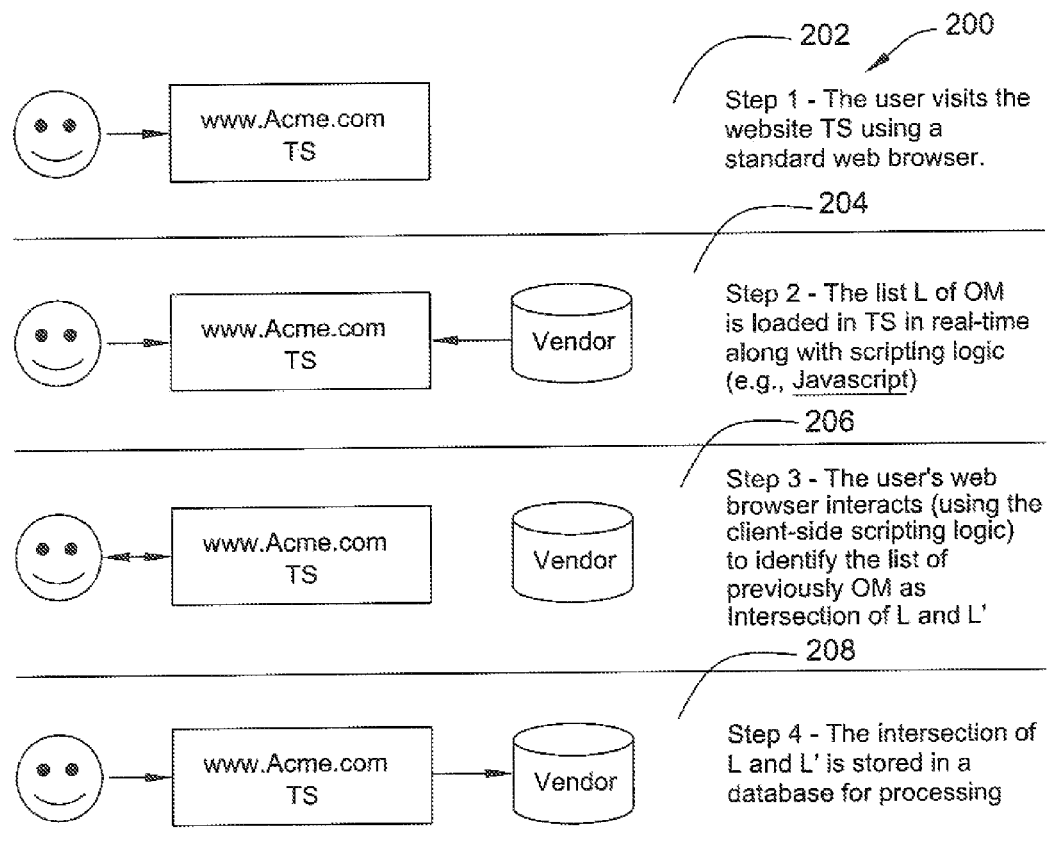
FIG. 2 shows in flow chart form an example method of monitoring visits to a target site.

Referring now to FIG. 2, a method 200 of attributing visits to an online target site 410 based on one or more origin sites is shown, according to an example aspect of the present disclosure. In one exemplary scenario, the example methodology is shown in the online case. The method 200 may involve three parties—the user (e.g., using client device 402) whose actions (e.g., visits to the target site 410) are being quantified, the product company Acme (e.g., the owner of target site 410 hosted on the content server 404), which wishes to quantify the action, and the monitoring company (e.g., owner of the monitoring server 406), which supplies the technology to accomplish this.

At 202, the user may visit the target site 410, for example by directing the client device 402 to access the target site 410. The target site 410 may contain the client-side scripting logic (e.g., embedded JavaScript for an HTML webpage) which executes on the client device 402, for example inside the web browser application of the client device 402.

At 204, as the script executes on the browser of the client device 402, the script may fetch the list L of origin sites 412 (e.g., from the monitoring server 406 or the content server 404) and may render them in the client device's web browser as an embedded list of origin sites 708 (e.g., using hyperlinks). For example, the hyperlinks (<a href=" . . . ">) may be rendered so that it is not visible or eye-catching to the user, for example using same or similar color as the background of the target site 410 and/or a relatively small font size.

At 206, the script may check each of the URLs in the embedded list of origin sites 708 against the browser history 408 of the client device 402. In one example, the script may check the visited CSS property of the hyperlink corresponding to each URL of the embedded list of origin sites 708. The visited CSS property may be set to true by the web browser application when the URL of the origin site is found in the browser history 408 (which may indicate that the user has previously visited the same URL). This may allow for determination of the list of visited origin sites L∩L'.

At 208, the list of visited origin sites (e.g., L∩L') may be transmitted (e.g., to the monitoring server 406 and/or the content server 404) for storage and/or further analytics, as desired. In some examples, 202, 204, 206, 208 may be executed using client-side script on the client device 402 while interacting with the content server 404 and the monitoring server 406 over the network 326, such as the Internet.

Figure 5:
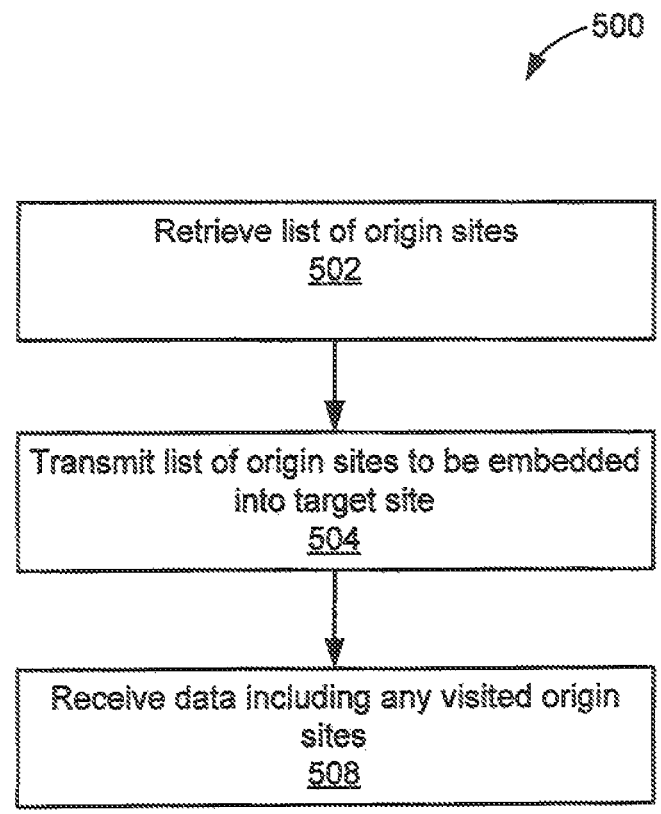
FIG. 5 is a flowchart illustrating an example method for monitoring visits to a target site, which may be from the viewpoint of a monitoring server.
Figure 6:
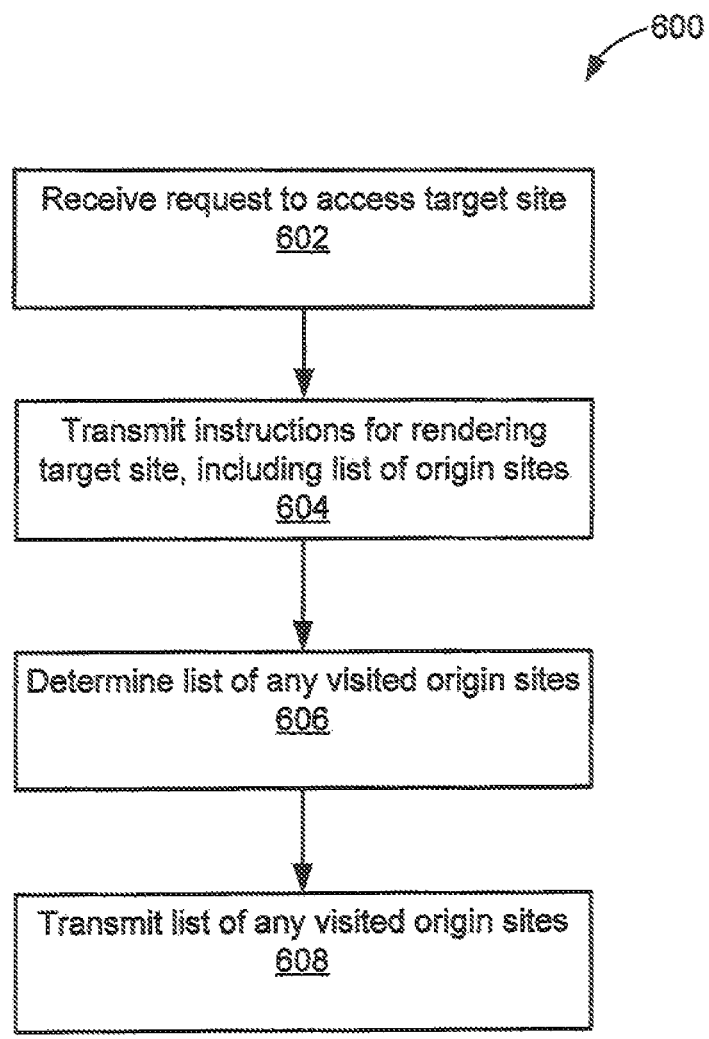
FIG. 6 is a flowchart illustrating an example method for monitoring visits to a target site, which may be from the viewpoint of a content server.

Reference is now made to FIGS. 5 and 6, which illustrates example methods 500 and 600 for monitoring visits to the target site 410. The example method 500 may be carried out by the monitoring server 406, for example. The example method 600 may be carried out by the content server 404, for example. In these example methods, communication and transmission of signals may take place over the network 326 or by any other suitable means. Although the method 500 and the 600 may be interrelated, the methods may also be carried out independently of each other.

The example method 500 may be carried out by the monitoring server 406.

At 502, the monitoring server 406 may retrieve the list of origin sites 412 to be embedded in a target site 410. This may be in response to received signals (e.g., from the client device 402 or from the content server 404) indicating a request to access the target site 410. In some examples, the list of origin sites 412 may be specific to the target site 410, for example coding (e.g., JavaScript) of the target site 410 may specify one or more origin sites of interest to be included in the list of origin sites 412 and/or may specify one or more predefined sets of origin sites to be embedded. In other examples, the list of origin sites 412 may be generic. Where one or more origin sites of interest and/or one or more predefined sets of origin sites are specified, additional unspecified origin sites may be added to the list of origin sites 412 (e.g., according to a recent or real-time update). In some examples, where the list of origin sites 412 is dynamic, retrieving the list of origin sites 412 may include generating the list in real-time (e.g., at the time the request to access the target site 410 is received), based on real-time determination of relevant origin sites (e.g., based on an online search of mentions of the target site 410).

At 504, the monitoring server 406 may transmit the list of origin sites 412 to be embedded into the target site 410. The list of origin sites 412 may be embedded within the target site 410 by the monitoring server 406 or by the content server 404. For example, the monitoring server 406 may transmit the list of origin sites 412 to the content server 404 which in turn embeds the list of origin sites 412 into the instructions for rendering the target site 410. The embedded list of origin sites 708, 412 may be presented within the target site 410 in an unobtrusive manner. For example, the embedded list 708, 412 may be presented at the bottom of the target site 410, using text smaller than the general text of the target site 410, using color similar to the background color of the target site 410 and/or any other suitable means.

In some examples, there may be embedded instructions within the target site 410 such that, when accessed by the client device 402, the client device 402 is caused to determine if any entry in the list of origin sites 412 has been visited (e.g., by making a comparison between the embedded list of origin sites 412 and its browser history 408). Such instructions may be, for example, in the form of JavaScript that is executed by the client device 402 when the target site 410 is rendered on the client device 402. Alternatively, determination of any visited origin sites may be made by the content server 404.

At 508, the monitoring server 406 may receive the list of visited origin sites, for example from the client device 402 or the content server 404, after the determination described above. The list of visited origin sites may be stored (e.g., in a memory of the monitoring server 406, or in another suitable memory) for further analysis. In some examples, where other information is collected about offline origin media, such information may be stored together.

The example method 600 may be carried out by the content server 404.

At 602, the content server 404 may receive a request to access the target site 410. For example, the client device 402 may transmit the request access to the target site 410. For example, a user using the client device 402 may enter a web address (e.g., URL) or select a link to navigate to the target site 410. Such a request may be transmitted to the appropriate content server 404. The content server 404 may transmit appropriate instructions (e.g., HTML code) to the client device 402 for rendering the target site 410. Such instructions may include, for example, JavaScript that when executed by the client device 402 may cause the signals indicating a request to access the target site 410 to be transmitted to the monitoring server 406.

At 604, instructions for rendering the target site 410 (e.g., in the form of source code) may be transmitted by the content server 404 (e.g., to the client device 402), including any modifications such as the inclusion of the embedded list of origin sites 708, 412. The target site 410 may be rendered by the client device 402 and displayed to the user. For example, the target site 410 may be rendered to include content 702, internal links 704, external links 706, and/or any other material. The embedded list of origin sites 708, 412 may also be rendered, for example as a list of hyperlinks.

At 606, a list of any visited origin sites may be determined. This may be carried out by the content server 404, for example as instructed by the example JavaScript described above. For example, where the embedded list of origin sites 708, 412 is rendered as a list of hyperlinks, this determination may be done by checking the text color of each hyperlink, where visited sites (i.e., those that are found in the browser history 408) may appear in a different color than unvisited sites (i.e., those that are not found in the browser history 408). A list of visited origin sites (e.g., L∩L' as described above) may be generated based on this determination. This determination may be carried out only by checking the entries included in the embedded list of origin sites 708, 412 and without accessing, reading or otherwise querying the browser history 408 of the client device 402, which may help to avoid any invasion of a user's privacy.

At 608, the list of visited origin sites may be transmitted, for example from the content server 404 to the monitoring server 406. In some examples, such as where there is constant communication between the content server 404 and the monitoring server 406, the list of visited origin sites may be immediately transmitted (e.g., via the network 326) to the monitoring server 406. In other examples, such as where there is intermittent communication between the content server 404 and the monitoring server 406, the list of visited origin sites may be stored on the content server 404 (e.g., with other previously determined lists of visited origin sites) and may be transmitted to the monitoring server 406 at certain intervals.

Although the method 500 has been described as being carried out by the monitoring server 406, in some examples the method 500 may instead be carried out by the content server 404, such as where the list of origin sites 412 is stored in the memory of the content server 404.

Where the method 500 is carried out by the monitoring server 406, there may be minimal effect on the conventional operations of the content server 404. The results of the monitoring by the monitoring server 406 (e.g., the list of visited origin sites and/or media L∩L') may be accessible by or provided to the content server 404 or the owner of the target site 410 regularly or irregularly. In some examples, further analysis may be performed on the list of visited origin sites and/or media (e.g., sorting visits by demographics) before such analysis is provided.

In some examples, the list of visited origin sites and/or media may be further analysed (e.g., by the monitoring server 406). For example, the list of visited origin sites and/or media may be associated with specific users and/or specific visits to the target site 410. A plurality of such lists may be collected for a given target site 410, covering visits from a plurality of client devices 402 over a period of time. An example analysis of these lists, aggregated for multiple client devices 402, may be to count the number of times a given origin site or medium appears and produce a list of the visited origin sites and/or media having the highest counts. These originating sites and/or media may be identified as being responsible for generating the most referrals to the target site 410. The lists of visited origin sites and/or media may also be utilized for performing more detailed data mining operations (e.g., demographic or geographic analyses) and/or temporal trend mining utilizing the data from multiple users and the recorded time.

Generation of the list of origin sites 412 (e.g., by the monitoring server 406) may be based on various factors. In some examples, the list of origin sites 412 may be static and decided in advance (e.g., selected by the owner of the target site 410 or predefined at the monitoring server 406), but in other cases a dynamically updated list of origin sites 412 may be used. This dynamic list of origin sites 412 may be based on various factors including, for example, the authority of a given origin site, sentiment (e.g., positive or negative) of the mention of the target site 410, time of posting and/or demographic attributes, such as age, gender, location, or profession, and/or other suitable factors. Based on these factors and/or depending on the design criteria of a particular application, it may be relatively straightforward to generate the list of origin sites 412. These different choices may be illustrated by means of an example, below.

Consider an example scenario where the company Acme (e.g., owner of target site 410) is interested in using the disclosed methods and systems to quantify the impact of online mentions in origin sites by relating such mentions to its products. Utilizing an example social media monitoring program according to aspects of the present disclosure, online mentions of Acme may be discovered. The origin sites having top mentions may be selected for further processing:

Each of the discovered mention may be associated with one or more attributes $\{a_i\}$ including, for example, authority score, sentiment towards Acme, age of the author, gender of the author, location of the author, relevance towards Acme and/or any other suitable attribute. In this example, each of these attributes may be represented as a number between 0 and 100 with 100 representing the most desired value. In one example, this may be achieved by using a number of methods such as linear transformation. Hence, each of the discovered mentions may be assigned a score using the formula below, where $w_i$ is the weight of the attribute $a_i$:

$$score = \Sigma a_i * w_i$$

Each of the discovered mentions may be sorted based on the score to determine the top origin sites to be included in the list of origin sites 412. This list may be updated in real-time (e.g., regularly or irregularly) to account for any newly discovered mentions and/or changes in the attribute values. Such dynamic generation of the list of origin sites 412 may be carried out by the monitoring server 406, and may be managed by an administrator accessing the monitoring server 406.

Other suitable methods and/or formulae for generating the list of origin sites 412 may be used. In some examples, generation of the list of origin sites 412 may be carried out by a party other than the monitoring server 406 (e.g., a data mining specialist).

Different target sites 410 may be associated with different lists of origin sites 412. Labels or identifiers may be used to associate one or more chosen lists of origin sites 412 with a given target site 410. Multiple target sites 410 may be associated with the same list of origin sites 412.

Example aspects of the present disclosure may present a formal framework suitable for correlating user actions such as a purchase or visit to a target site 410 with a mention or product attribution found in an origin site or medium. In some examples, the disclosed framework may be generic and may be applicable to both online and offline scenarios. Example aspects of the present disclosure present methods and systems suitable for realizing this framework, particularly for a target site 410 accessible by computers.

Figure 3:
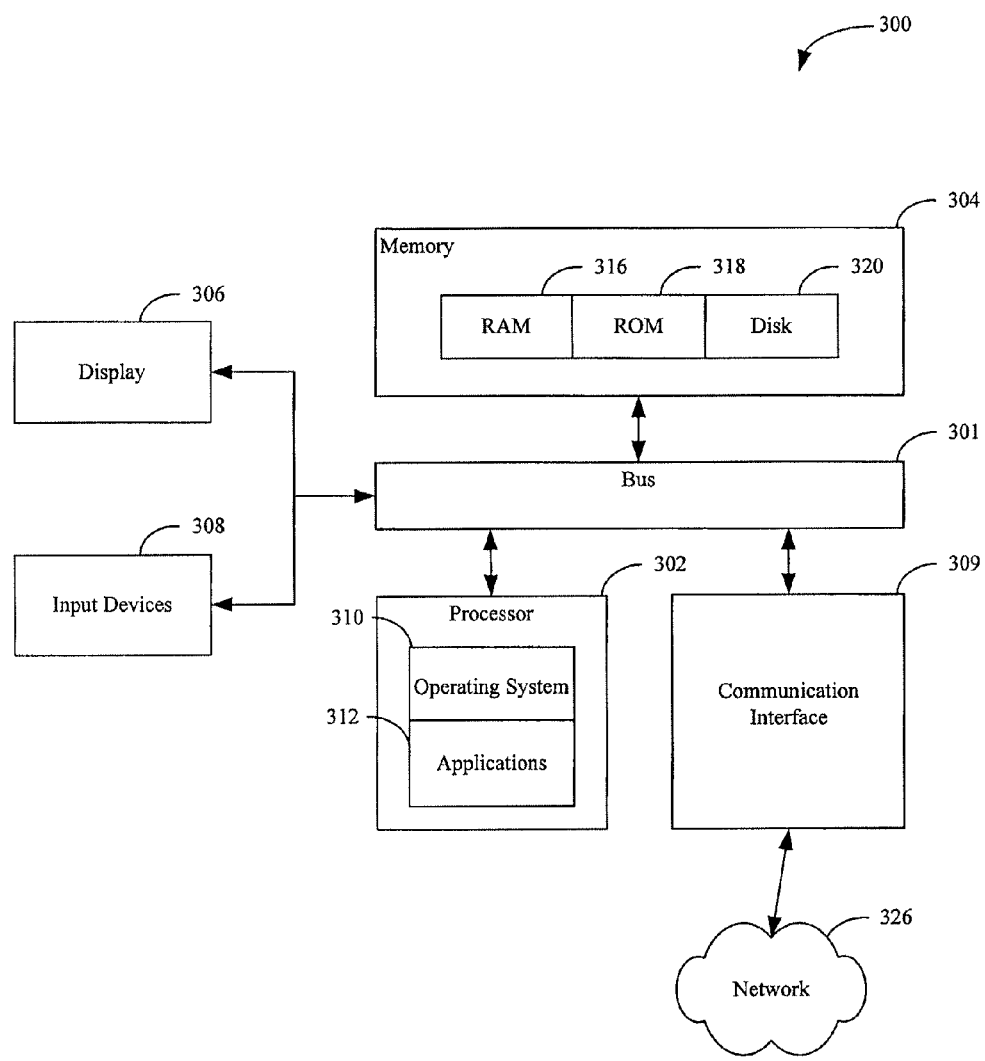
FIG. 3 is a schematic diagram illustrating an example computing device that may suitable for the methods and systems of the present disclosure.

Reference is next made to FIG. 3, which shows a computing device architecture 300 that may be used to implement the methods discussed in connection with FIGS. 1 and 2. The description above mentions computers and/or servers for implementing various aspects of the methods discussed above. Computers and/or servers may also be suitably substituted with wireless handheld or portable electronic devices. The computing device architecture 300 may be representative of any of the mobile devices or any of the computing devices, servers, or computers described above. The device architecture 300 or variations thereof may be used by the client device 402, the content server 404 and/or the monitoring server 406.

The computing device 300 generally comprises a bus 301, a processor 302, a memory 304, a display 306, user input devices 308, and a communication interface 309, which may all be coupled to the bus 301. In one example, the user input devices 308 are a keyboard or pointing device such as a mouse. The communication interface 309 provides an interface for communicating with a network 326. An operating system 310 or applications 312 run on the processor 302. The memory 304 includes Random Access Memory (RAM) 316, Read Only Memory (ROM) 318, and a disk 320. In one example, the data processing system 300 comprises either a client or a server. Any of the method 100 or 200 or anything else described above may be encoded in software modules and may be stored in or recorded on a computer readable medium such the memory 304 for execution by the processor 302. The methods 100 or 200 or anything else described above may be designed to operate on a single computing device 300, or in a distributed form on two or more computing devices 300 connected by a suitable network.

While aspects of this application are primarily discussed as a method, persons of ordinary skill in the art would understand that the systems described above may be programmed and configured to enable the methods of the application to be practised. Moreover, articles of manufacture for use with the systems, such as a pre-recorded storage device or other machine or computer readable medium including program instructions recorded thereon may direct the systems to facilitate the practise of the methods of the application. It is understood that such systems and articles of manufacture also come within the scope of the application.

The embodiments of the present application described above are intended to be examples only. Those skilled in the art may effect alterations, modifications and variations to the particular embodiments without departing from the scope of the present application. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology. All references are hereby incorporated by reference in their entirety.

The invention claimed is:

1. A system for monitoring visits to a target site on a network, the system comprising a server including:
   a processor;
   a communication subsystem for transmitting and receiving signals with the network; and
   a memory coupled to the processor, the memory having stored thereon processor-executable instructions that, when executed, cause the processor to:
   in response to received signals indicating a request to access the target site, retrieve a list of one or more origin sites from the memory;
   transmit the list of one or more origin sites to be included in embedded instructions for rendering the target site by a client device; and
   receive signals representing a data set including a list of any entries in the list of one or more origin sites that have been visited;
   wherein the embedded instructions direct the client device to:
   render as a hyperlink each entry in the list of one or more on in sites; and
   based on the rendering of the respective hyperlink, determine whether the respective origin site has been visited.

2. The system of claim 1 wherein the embedded instructions direct the client device to determine whether each origin site has been visited at least partly by making a comparison between the respective hyperlink and a browser history at the client device.

3. The system of claim 1 wherein the embedded instructions in the target site comprises JavaScript.

4. The system of claim 1 wherein the instructions further cause the processor to update the list of one or more origin sites based on a calculated metric for attributes related to the one or more origin sites.

5. The system of claim 1 wherein the embedded instructions direct the client device to determine whether the respective origin site has been visited at least partly in accordance with a text color of the respectively rendered hyperlink, wherein visited hyperlinks are rendered by the client device in a different color than unvisited hyperlinks.

6. The system of claim 1 wherein the one or more respective hyperlinks are rendered in a text color similar to a background color of the target site and in a font size smaller than a text size of the target site.

7. The system of claim 1 wherein the instructions further cause the processor to store the list of any visited origin sites for further analysis.

8. A method, at a server, for monitoring visits to a target site, the method comprising:
   in response to received signals indicating a request to access the target site, retrieving a list of one or more origin sites;
   transmitting the list of one or more origin sites to be included in embedded instructions for rendering the target site by a client device; and
   receiving signals representing a data set including a list of any entries in the list of one or more origin sites that have been visited;
   wherein the embedded instructions direct the client device to:
   render as a hyperlink each entry in the list of one or more origin sites; and
   based on the rendering of the respective hyperlink, determine whether the respective origin site has been visited.

9. The method of claim 8 wherein the embedded instructions direct the client device to determine whether each origin site has been visited at least partly by making a comparison between the respective hyperlink and a browser history at the client device.

10. The method of claim 8 wherein the embedded instructions in the target site comprises JavaScript.

11. The method of claim 8 further comprising updating the list of one or more origin sites based on a calculated metric for attributes related to the one or more origin sites.

12. The method of claim 8 wherein embedded instructions direct the client device to determine whether the respective origin site has been visited at least partly in accordance with a text color of the respectively rendered hyperlink, wherein visited hyperlinks are rendered by the client device in a different color than unvisited hyperlinks.

13. The method of claim 8 wherein the one or more hyperlinks are rendered in a text color similar to a background color of the target site and in a font size smaller than a text size of the target site.

14. The method of claim 8 further comprising storing the list of any visited origin sites for further analysis.

15. A method for monitoring visits to a target site, the method comprising:
- in response to a received request to access the target site, transmitting a data set representing the target site to be rendered, the data set including embedded instructions for rendering a list of one or more origin sites within the target site by a client device;
- determining whether each entry in the list of one or more origin sites is a visited origin site, to generate a list of any visited origin sites; and
- transmitting a data set representing the list of any visited origin sites;

wherein the embedded instructions direct the client device to:
- render as a hyperlink each entry in the list of one or more origin sites; and
- based on the rendering of the respective hyperlink, determine whether the respective origin site has been visited.

16. The method of claim 15 wherein the determining comprises evaluating a rendered text color or a visited flag associated with each entry in the list of one or more origin sites.

17. The method of claim 15 wherein the embedded instructions included in the data set representing the target site comprises JavaScript.

18. The method of claim 15 wherein the embedded instructions direct the client device to determine whether the respective origin site has been visited at least partly in accordance with a text color of the respectively rendered hyperlink, where visited hyperlinks are rendered by the client device in a different color than unvisited hyperlinks.

19. The method of claim 15 wherein the one or more respective hyperlinks are rendered in a text color similar to a background color of the target site and in a font size smaller than a text size of the target site.

20. The method of claim 15 wherein the embedded instructions direct the client device to determine whether each origin site has been visited at least partly by making a comparison between the respective hyperlink and a browser history at the client device.

* * * * *